Aug. 22, 1950   J. G. WILSON ET AL   2,519,618
EVAPORATOR AND FLUID CONTACT APPARATUS
Filed July 25, 1947                              2 Sheets-Sheet 1

Inventors:
Joseph G. Wilson
Edward B. Wist
By Oswald H. Milmore
their Attorney

Patented Aug. 22, 1950

2,519,618

UNITED STATES PATENT OFFICE 2,519,618

EVAPORATOR AND FLUID CONTACT APPARATUS

Joseph G. Wilson, Berkeley, and Edward B. Wist, Alameda, Calif., assignors to Shell Development Company, San Francisco, Calif., a corporation of Delaware Application July 25, 1947, Serial No. 763,680

15 Claims. (Cl. 261—9)

This invention relates to apparatus useful for evaporating liquids in contact with a gas, wherein the liquid is distributed into a plurality of tubes which may be externally heated and is dispersed and intimately mixed with a gas while in said tubes. Depending upon the purpose of the apparatus such tubes are variously designated as contact tubes or evaporator tubes, it being evident that such devices are useful for effecting contact between a liquid and a gas regardless of whether evaporation of the liquid takes place.

It is frequently necessary to vaporize heat sensitive liquids, i. e., liquids which are easily decomposed or polymerized upon being heated for prolonged periods. Ordinary boiling would cause vaporization but would also result in the loss of a large proportion of the liquid by chemical change. To obviate this difficulty it has heretofore been proposed to arrange the evaporator to insure a very rapid heating of the liquid, thereby promoting vaporization within a short time. In such operations the liquid is flowed as a film along the full length of a heated tube wall. It has also been proposed to use an entraining gas for reducing the partial pressure of the liquid. For example, if glycerine is vaporized in steam at an absolute pressure of 1 mm. of mercury, the partial pressure of the steam may be 0.75 mm. and that of the glycerine vapor only 0.25 mm., with the result that vaporization can be achieved at a lower temperature with a given vacuum in the system.

Difficulties are often experienced with known evaporators of the type described above in that the distribution of the liquids over the several tubes is not uniform, and the ratio of liquid to entraining gas is variable, both as between different tubes and in any one tube at different times. It has also been difficult to attain intimate contact of the liquid in the entraining gas.

Evaporators employing a plurality of heated tubes with individual liquid feed means, supplied from a common liquid reservoir, are already known. (See U. S. Patent Nos. 341,669, 1,200,996, and 1,265,863.) Such evaporators are not, however, suitable for evaporating heat sensitive liquids because they fail to disperse the liquid in fine droplets in the entraining gas and are frequently subject to uneven flow of liquid.

It is an object of this invention to provide an apparatus of the type described, i. e., a device for entraining a liquid in a gas within a plurality of tubes, either for evaporation of the liquid or merely for effecting contact between the liquid and the gas, wherein the liquid is uniformly distributed into a plurality of externally temperature conditioned tubes, e. g., heated or cooled, and the liquid is effectively subdivided and brought into intimate contact with gas.

A further object of the invention is to provide an improved apparatus of the type described wherein the liquid is metered into the several evaporator or contact tubes from a liquid reservoir, through individual orifices while subjected to the pressure of the entraining gas whereby changes in the liquid head due to surging or in the gas pressure will produce less variation in the rate of flow of the liquid into the tubes than in systems utilizing overflow weirs or flow distributing means of the type shown in the aforementioned patents.

A further object is to provide an apparatus of the type described having, in combination, individual liquid and vapor metering orifices in each tube to proportion the flow of the liquid and of the gas into the several tubes.

Still another object is to provide a device wherein the vapor orifices are arranged to disperse the liquid fed into each tube, thereby causing a fine subdivision of the liquid for the effective contact thereof with the gas.

With these and other objects in mind, which will be apparent from the following description, the invention consists in the arrangement of tubes and metering orifices for the flow of liquid and gas described hereinafter, certain embodiments of which are illustrated in the drawings forming a part of this specification, wherein.

Figure 1:
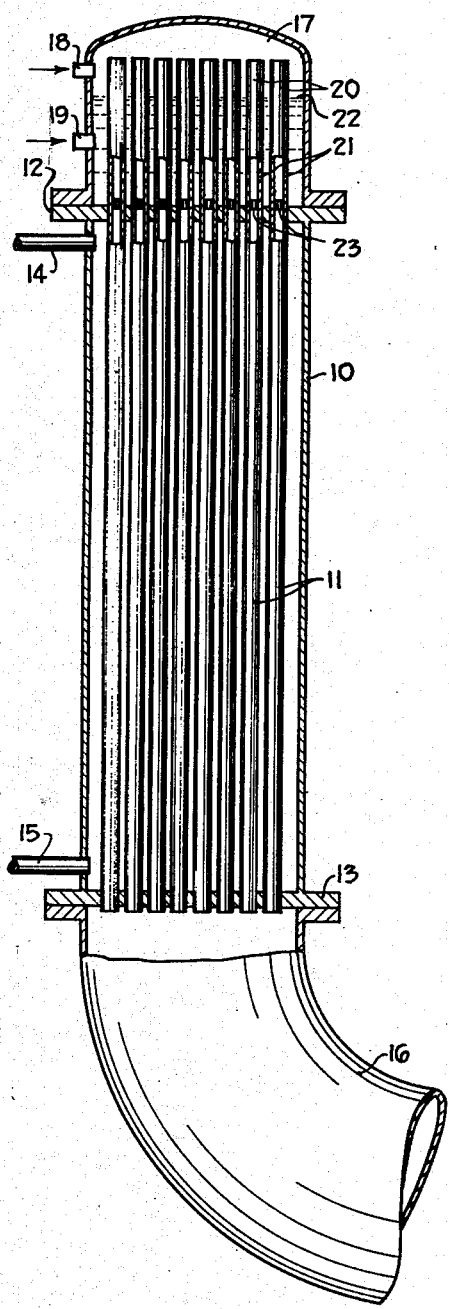
Fig. 1 is vertical-sectional view of an evaporator constructed according to the invention.

Referring to Fig. 1 of the drawing, 10 is a shell forming a heating jacket enclosing a bundle of evaporator tubes 11 mounted at the top and bottom in tube sheets 12 and 13. A thermal fluid, such as heated steam, or a cooling agent, may be circulated through the jacket through inlet 14 and outlet 15, for heating or cooling the tubes 11. A gas discharge pipe 16 is in communication with the tubes 11 and is adapted to lead the gas together with evaporated and/or dispersed liquid to a separator and accumulator, not shown, which may be under suitable vacuum.

A dome 17 is mounted over the upper tube sheet 12, and provided with a vapor inlet 18 and a liquid inlet 19 through which the entraining gas and the liquid to be evaporated or dispersed in the gas may be fed, respectively. Each tube 11 has a portion 20 extending almost to the top of the dome 17, and in free communication with the space in the top of the dome. These portions may be regarded as inlet tubes and may be integral with the tubes 11 or may be separately fitted short pieces of tubing. The space within the dome 17 forms a liquid reservoir at the bottom and a gas chamber at the top.

Each inlet tube is provided with one or more liquid metering orifices 21 located at a convenient distance below the intended liquid level 22, which may be regulated by controlling the feed of liquid through inlet 19 by any means known per se, e. g., an ordinary valve or a liquid level controller. Each inlet tube is, further, provided with one or more vapor metering orifices 23 which are located to require both the gas and the liquid to flow therethrough.

In the operation of the apparatus as an evaporator, a vapor diluent or entrainer, preferably one at a temperature above that of the liquid such as superheated steam, is supplied to the vapor space over the liquid through the vapor inlet 18 and the liquid is supplied to the liquid reservoir through the inlet 19. The vapor enters the open top ends of the inlet tubes 20 and passes downward through each inlet tube, while liquid enters the inlet tubes through the metering orifices 21. The liquid is metered into each inlet tube through a separate orifice, at a rate depending upon the size of the orifice, the density and viscosity of the liquid, and the height of the level 22. The surface of the liquid in the reservoir is in contact with the gas, in the gas space, whereby variations in the gas pressure will have little or no effect on the rate of liquid flow, and such liquid as evaporates from the surface will be carried down with the gas. The gas pressure will in many cases be slight, particularly when a vacuum is applied to the line 16.

Flow of the dispersion through the tubes 11 is usually rapid and residence periods of from 0.5 to 5.0 seconds are typical. When the device is used as an evaporator, it is desirable that the small droplets come into engagement with the tube walls either immediately below the vapor metering orifices or at some point further down on the tube.

The rate of gas flow is regulated in each inlet tube by means of constrictions forming vapor metering orifices 23. These orifices serve a second important function: because the liquid must flow through these orifices as well as the gas, it is dispersed in the gas. The orifices may be arranged to cause an outwardly flaring, thin sheet of liquid to be discharged against the walls of the tubes; the orifices may also form small droplets of liquid which, preferably, move outwardly so as to impinge on the tube walls. The resulting dispersion passes through the tubes 11, which may, when the apparatus is used as an evaporator, be suitably heated. Vapor and unevaporated material (if any) issuing from the lower ends of the tubes 11 are withdrawn through 16 and passed to suitable separating and accumulating equipment.

Figures 2, 3:
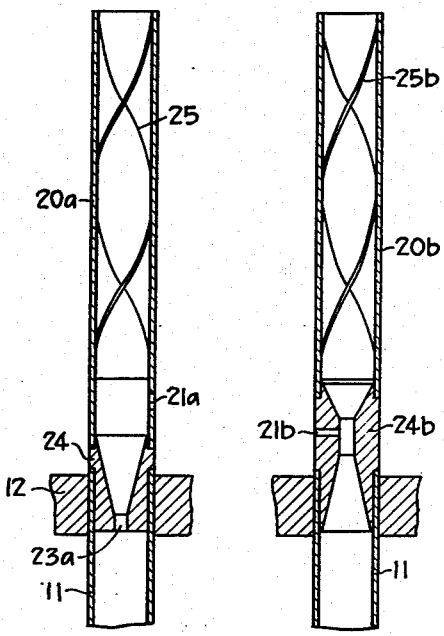
Figs. 2 and 3 are enlarged vertical-sectional views of two alternative forms of inlet tubes.

Figs. 2 and 3 show two preferred forms of inlet tubes provided with means for promoting the radially outward flow of the liquid through the gas against the tube walls. In Fig. 2 each inlet tube 20a is mounted on a plug 24 which is fitted into the top of tube 11. The plugs form the constrictions and each plug is provided with a throat as shown, forming a vapor metering orifice 23a at a level below the liquid metering orifice 21a. Vanes 25 are mounted within the inlet tubes 20a to impart a rotary or helical motion to the descending gas. This rotary movement tends to throw the liquid droplets against the side walls of the heated tubes 20, thereby promoting heat transfer.

In Fig. 3 the inlet tubes 20b are similarly mounted in plugs 24b and are provided with vanes 25b. The plugs are, however, of a different construction, being flared both above and below the throat to create a low pressure zone at the throat. The liquid metering orifice 21b is located opposite the throat instead of in the tube 20b, whereby the liquid is drawn in, and the rate of flow of liquid will increase somewhat with increasing rates of gas flow because of the aspirator action.

While vanes in the inlet tubes were shown in Figs. 2 and 3, it is evident that any other means, known per se, may be applied to impart a rotary movement to the gas; for example, propeller blading or tangentially arranged vapor admission ports may be provided in the inlet tubes or in the evaporator tubes 11.

Figure 4:
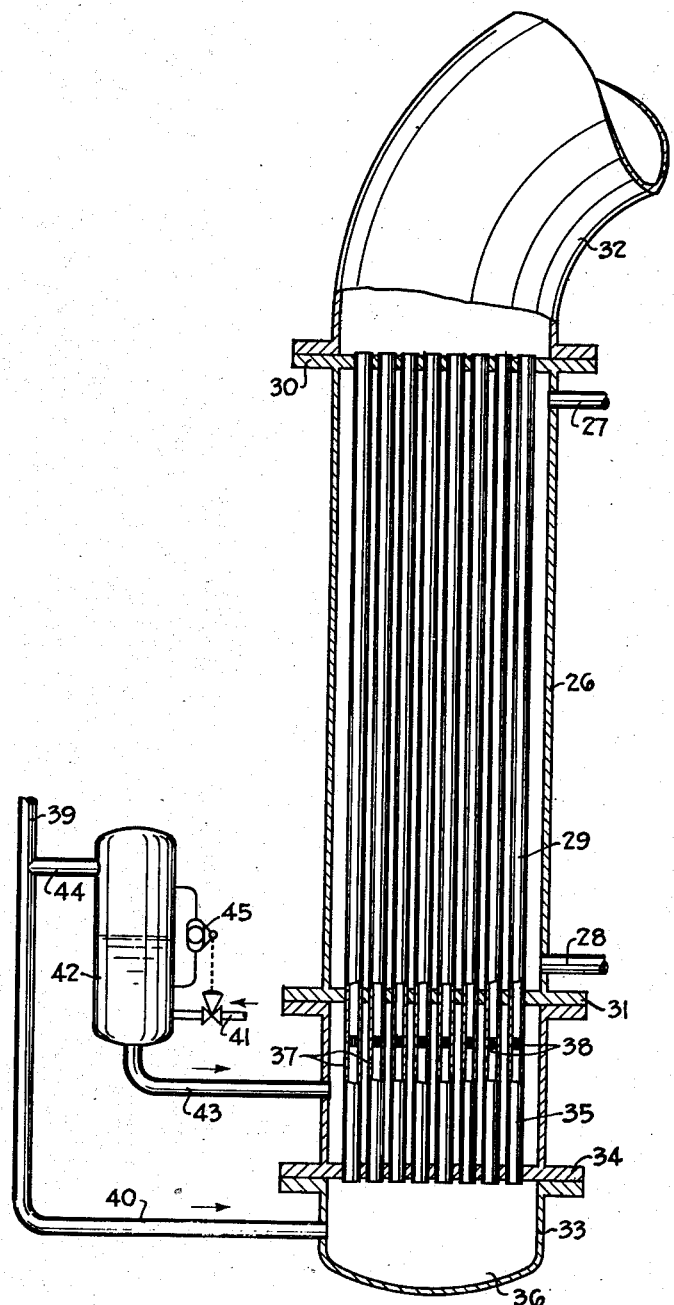
Fig. 4 is a vertical cross-sectional view of a modified arrangement of the evaporator suitable for upward flow of the liquid and gas.

It is also possible to adapt the device for operation with upflow through the evaporator tubes. Such an arrangement is illustrated in Fig. 4, wherein 26 is the shell, provided with connections 27 and 28 for the circulation of a heating or cooling fluid and containing a plurality of tubes 29 fitted in tube sheets 30 and 31. These tubes are in flow communication at their upper ends with a draw-off line 32 for the discharge of the entraining gas, together with evaporated and/or unevaporated liquid. The dome 33 is provided with an auxiliary tube sheet 34 in which inlet tubes 35 are fitted. The space beneath the tube sheet 34 forms a gas chamber 36. The inlet tubes are in communication with the respective tubes 29 and with space 36. The space between tube sheets 31 and 34 and surrounding the inlet tubes 35 forms a liquid feed reservoir, from which liquid may enter the inlet tubes through liquid metering orifices 37. Each tube is provided with vapor metering orifice 38.

Entraining gas is supplied through vapor inlet lines 39 and 40 to the space 36, from which vapor rises through the inlet tubes 35 and evaporator tubes 29. Liquid is supplied through a valve 41, tank 42 and inlet 43 and enters the inlet tubes 35 through the liquid metering orifices 37 and vapor metering orifices 38, being dispersed in the manner previously described for Fig 1. To equalize the pressure between the gas and the liquid, the space above the liquid in the tank 42 is connected to the vapor inlet lines by a branch line 44. The liquid level may be suitably controlled by a liquid level controller 45.

The feeding of liquid and gas in the embodiment according to Fig. 4 is similar to that for Fig. 1, except that the gas and liquid flow upwardly through the tubes 35 and 29. The inlet tubes 35 may be of any desired constructions and the modifications shown in Figs. 2 and 3 may be applied to this embodiment.

We claim as our invention:

1. In combination, a shell having a space for containing a thermal fluid, a battery of contact tubes partly within said space for contact with said thermal fluid, a liquid reservoir isolated from said space, a gas chamber, means for supplying liquid to said liquid reservoir, means for supplying gas to said gas chamber, each contact tube having a portion extending through said liquid reservoir and in flow communication with said gas chamber, a liquid metering orifice in each tube, and a constriction having a vapor metering orifice within each tube, located to cause both gas from said gas chamber and liquid flowing through said liquid metering orifice to pass through the vapor metering orifice.

2. The combination according to claim 1 wherein the gas chamber is in flow communication with the liquid reservoir independently of said tubes.

3. The combination according to claim 2 wherein the gas chamber is above the liquid reservoir and within a common housing.

4. The combination according to claim 2 wherein the gas chamber is beneath the liquid reservoir.

5. The combination according to claim 1 wherein each tube is provided with means for imparting a rotary movement to the gas flowing therethrough, whereby the liquid admitted through said liquid metering orifices and entrained by said gas is hurled against the side walls of the tubes.

6. The combination according to claim 5 wherein the means for imparting rotary movement comprises a helical vane mounted within each tube between its communication with the gas chamber and said constriction.

7. An evaporator comprising a shell for containing a thermal fluid, a battery of substantially vertically disposed evaporator tubes within said shell, a tube sheet at the top and bottom of said shell, a dome at one end of said shell beyond the respective tube sheet, each evaporator tube having a portion thereof extending into said dome and open at its end, means for supplying a gas to the dome for flow into the open ends of said tubes, a liquid metering orifice in each tube, means for admitting liquid to the space within said dome surrounding the portions of the tubes containing the liquid metering orifices, and a constriction having a vapor metering orifice within each tube, located to cause both gas and liquid fed through said liquid metering orifice to pass through the vapor metering orifice.

8. An evaporator comprising a shell for containing a thermal fluid, a battery of substantially vertically disposed evaporator tubes within said shell, a tube sheet at the top and the bottom of said shell, a closed wall structure at one end of said shell defining an enclosure beyond the respective tube sheet, each evaporator tube having a portion thereof extending into said enclosure and open at its end, means for supplying a gas to the part of said enclosure at the open tube ends for flow into the open ends of said tubes, a liquid metering orifice in each tube, means for admitting liquid to the part of the enclosure at the portions of the tubes containing the liquid metering orifices, and a constriction having a vapor metering orifice within each tube, located to cause both gas and liquid fed through said liquid metering orifice to pass through the vapor metering orifice.

9. The evaporator according to claim 8 wherein the liquid metering orifice in each tube is located between the said vapor metering orifice and the open end of the tube.

10. The evaporator according to claim 8 wherein each liquid metering orifice is located to feed liquid into the constriction in the tube.

11. An evaporator comprising a shell for containing a thermal fluid, a battery of substantially vertically disposed evaporator tubes within said shell, a tube sheet at the top and bottom of said shell, a dome at one end of said shell beyond the respective tube sheet, an inlet tube for each evaporator tube extending into said dome and open at its end remote from the evaporator tubes, means for supplying a gas to the dome for flow into the open ends of said inlet tubes, a liquid metering orifice in each inlet tube between its open end and said respective tube sheet, means for admitting liquid to the space within said dome surrounding the portion of the inlet tube containing the liquid metering orifice, and a constriction having a vapor metering orifice within each inlet tube, located to cause both gas and liquid fed through said liquid metering orifice to pass through the vapor metering orifice.

12. An evaporator comprising a shell for containing a thermal fluid, a battery of substantially vertically disposed evaporator tubes within said shell, a tube sheet at the top and bottom of said shell, a closed wall structure at one end of said shell defining an enclosure beyond the respective tube sheet, an inlet tube for each evaporator tube extending into said enclosure and open at its end remote from the evaporator tubes, means for supplying a gas to the part of the enclosure remote from the evaporator tubes for flow into the open ends of said inlet tubes, a liquid metering orifice in each inlet tube between its open end and said respective tube sheet, means for admitting liquid to the part of the enclosure surrounding the portion of the inlet containing the liquid metering orifice, and a constriction having a vapor metering orifice within each inlet tube, located to cause both gas and liquid fed through said liquid metering orifice to pass through the vapor metering orifice.

13. The evaporator according to claim 12 wherein the wall structure is at the top of the shell and forms a continuous enclosure in which liquid is adapted to collect at the bottom and the gas is adapted to collect above the liquid and in contact therewith.

14. The evaporator according to claim 12 wherein the wall structure is at the bottom of the shell and is provided with an auxiliary tube sheet separating the enclosure into an upper liquid reservoir and a lower vapor chamber, the inlet tubes extending through said auxiliary tube sheet.

15. The evaporator according to claim 14 wherein the means for supplying liquid to the enclosure comprises a tank having its bottom in flow communication with the liquid reservoir and its top in flow communication with the vapor chamber.

JOSEPH G. WILSON.
EDWARD B. WIST.

REFERENCES CITED

The following references are of record in the file of this patent:

UNITED STATES PATENTS

| Number | Name | Date |
| --- | --- | --- |
| 1,863,781 | Wright | June 21, 1932 |
| 1,951,812 | Smith | Mar. 20, 1934 |
| 2,054,734 | Akast | Sept. 15, 1936 |
| 2,094,959 | Pulidori | Oct. 5, 1937 |
| 2,096,407 | Reitmeyer | Oct. 19, 1937 |
| 2,207,390 | White | July 9, 1940 |
| 2,289,953 | Aldridge | July 14, 1942 |
| 2,316,832 | Aghnides | Apr. 20, 1943 |
| 2,385,200 | Friedel | Sept. 18, 1945 |